United States Patent [19]

Haley

[11] Patent Number: 4,808,063

[45] Date of Patent: Feb. 28, 1989

[54] ROBOT SYSTEM EMPLOYING FORCE/POSITION CONTROL

[75] Inventor: Paul H. Haley, Monroeville, Pa.

[73] Assignee: Westinghouse Electric Corp., Pittsburgh, Pa.

[21] Appl. No.: 116,089

[22] Filed: Nov. 3, 1987

[51] Int. Cl.⁴ ............................................. B25J 9/06
[52] U.S. Cl. ..................................... 414/730; 318/567; 364/513; 901/9; 901/20
[58] Field of Search ................ 414/5, 730; 901/2, 9, 901/10, 15, 20, 50, 19; 318/609, 610, 543, 567; 364/513

[56] References Cited

U.S. PATENT DOCUMENTS

| | | | |
|---|---|---|---|
| 4,243,923 | 1/1981 | Whitney et al. | 901/9 X |
| 4,445,273 | 5/1984 | Van Brussel et al. | 901/9 X |
| 4,488,242 | 12/1984 | Tabata et al. | 364/513 |
| 4,670,641 | 6/1987 | Porsander et al. | 318/609 X |
| 4,670,849 | 6/1987 | Okada et al. | 901/15 X |
| 4,672,279 | 6/1987 | Hosokawa et al. | 901/15 X |
| 4,680,519 | 7/1987 | Chand et al. | 364/513 X |

FOREIGN PATENT DOCUMENTS

| | | | |
|---|---|---|---|
| 2150989 | 4/1973 | Fed. Rep. of Germany | 318/610 |
| 2625933 | 12/1976 | Fed. Rep. of Germany | 901/15 |
| 1237567 | 6/1971 | United Kingdom | 318/610 |

OTHER PUBLICATIONS

"Indirect Control of the Forces of Constraint in Dynamic Systems", pp. 355-360, Hemami, H. and Wyman, B. F., Journal of Dynamic Systems, Measurement and Control, Dec. 1979, vol. 101.

"Joint Torque Control by a Direct Feedback for Industrial Robots", IEEE Transactions on Automatic Control, vol. AC-28, No. 2, Feb. 1983, Luh, J. Y. S., Fisher, W. D., Paul, R. P. C., pp. 153-161.

"Hybrid Position/Force Control of Manipulators", Journal of Dynamic Systems, Measurement and Control, ASME, Feb. 1981, Raibert, M. H., Craig, J. J., pp. 126-133.

"Motion Control in Robots", Masaru Uchiyama, Dept. of Precision Engineering, Faculty of Engineering, Tohoku University, Jan. 1982, pp. 666-671.

Primary Examiner—Frank E. Werner
Assistant Examiner—Donald W. Underwood
Attorney, Agent, or Firm—D. C. Abeles

[57] ABSTRACT

In a robotic assembly system including a robotic device composed of a base member, a plurality of movable members and joint mechanisms coupling the members in a sequence extending from the base member such that a first one of the movable members is supported by the base member and is rotatable relative to the base member about a respective axis and each of the other movable members is supported by, and rotatable about a respective axis relative to, a respective preceding movable member in the sequence, with the last movable member in the sequence being an end member for supporting a workpiece which is to be brought to a selected position relative to a fixed body by movement along a reference plane associated with the body, the selected position corresponding to a set of reference angular positions each of which defines an angular position of a respective movable member about the respective axis thereof, the joint mechanisms are controlled by a computer system coupled thereto in such a manner that one of the movable members is rotated in direct response to the force with which the workpiece is being pressed against the reference plane while each of the other movable members is rotated about is respective axis in a manner to bring the workpiece to the selected position while displacing the workpiece generally along the reference plane and pressing the workpiece against the reference plane with a force approaching a selected value.

10 Claims, 6 Drawing Sheets

------- LOW BANDWIDTH SIGNAL
———— HIGH BANDWIDTH SIGNAL

VELOCITY RESTRAINT CIRCUIT

POSITION BIAS PROCESSING CIRCUIT

ROBOT SYSTEM EMPLOYING FORCE/POSITION CONTROL

BACKGROUND OF THE INVENTION

The present invention relates to industrial robotic systems of the type including a robot device, which is typically six-jointed, and computer-driven control and displacement units connected for effecting rotation of each joint.

Many industrial assembly operations require that one part contact and then slide with respect to a second part until the plane of contact changes abruptly and the first part drops into place in the second part. This kind of task is easily accomplished if the one part is restricted to straight line motion with a constant force applied to this part in the direction of the straight line motion. This is an example of force/position control in which force is controlled in a given direction and position is controlled in a plane perpendicular to the force direction.

This type of control is simple to achieve with a cartesian coordinate robot when the straight line motion is aligned with one of the robot axes. However, with jointed robots, force/position control is more difficult since in general all six joints must be controlled simultaneously in order to effect straight line motion of the robot manipulator.

The basic components of a six-jointed robot are illustrated in simplified form in FIG. 1. This device includes a fixed base 2, five linking members 4, 6, 8, 10 and 12 and an end member 14 which carries or guides the part to be assembled and is normally provided with some type of gripping mechanism.

Base 2 and members 4, 6, 8, 10, 12 and 14 are coupled together by pivot joints 21, 22, 23, 24, 25 and 26 each having a joint motor. Pivot joints 22, 23 and 25 have transverse axes and joints 21, 24 and 26 have longitudinal axes.

Each member can thus be pivoted about a respective joint axis from a reference angular position, the angular deviation from the reference position being known as the joint angle for that joint. The joint angles for joints 21-26 are designated $\theta_1$, $\theta_2$, $\theta_3$, $\theta_4$, $\theta_5$ and $\theta_6$.

The precise position and orientation of member 14 is a function of the six joint angles. The position of member 14 can be defined in terms of the x, y and z coordinates of a reference point on member 14 relative to a fixed coordinate system. The orientation of member 14 can be defined by the orientation of a selected plane of member 14 containing the reference point and in terms of three Euler angles $\phi$, $\theta$ and $\Psi$ which designate the orientation of the selected plane relative to the fixed coordinate system. These angles are designated on the basis of the orientation of a local coordinate system associated with the selected plane relative to the fixed coordinate system, as will be explained with reference to FIGS. 2A-2D in which the reference point on member 14 is designated R.

In FIG. 2A, a fixed plane 52 parallel to the x-y plane of the fixed coordinate system is congruent with the selected plane 54 of member 14. Plane 54 is associated with coordinates x', y', z' congruent with fixed coordinates x, y, z, respectively. Plane 54 can have any orientation relative to plane 52, defined by angles $\phi$, $\theta$ and $\Psi$. If, to arrive at the final orientation shown in FIG. 2D, plane 54 is rotated about congruent axes z, z', an angle $\phi$ is formed between axes x and x'. Then rotation of plane 54 about axis x' forms angle $\theta$ between axes z and z'. Finally, rotation of plane 54 about axis z' forms angle $\Psi$ between axis x' and the line of intersection of planes 24 and 54.

Each set of values for x, y, z, $\phi$, $\theta$, $\Psi$ of the reference point R and plane 54 of member 14 produces a unique set of values for the coordinates $\theta_1$–$\theta_6$.

Force/position control is a current research topic in robot control. A typical method which has been proposed is as follows. A projection operator $P_F$ defines the direction in which one wants to control the force and a complementary projection operator $P_P$ defines the directions in which one wants to control position. A feedback loop is then implemented in that sensors measure the six joint angles $\theta_1$, $\theta_2$, $\theta_3$, $\theta_4$, $\theta_5$, and $\theta_6$, and a nonlinear transformation on these angles is performed to yield the three position coordinates x, y and z and the three Euler angles $\phi$, $\theta$, and $\Psi$. Three angle corrections $$\Delta\phi = \phi - \phi_R, \tag{1a}$$

$$\Delta\theta = \theta - \theta_R \tag{1b}$$

$$\Delta\Psi = \Psi - \Psi_R \tag{1c}$$

are computed where $\phi_R$, $\theta_R$ and $\Psi_R$ are desired or set-point values. Three position corrections $$\Delta x = x - x_R \tag{2a}$$

$$\Delta y = y - y_R \tag{2b}$$

$$\Delta z = z - z_R \tag{2c}$$

are also computed where x, y and z are actual coordinate values and $x_R$, $y_R$ and $z_R$ denote a point on the straight line of desired motion. Then $$\begin{bmatrix} \Delta u \\ \Delta v \end{bmatrix} = P_P \begin{bmatrix} \Delta x \\ \Delta y \\ \Delta z \end{bmatrix} \tag{3}$$

defines the desired projection of the position correction. A force error $$\Delta f = P_F \begin{bmatrix} f_x - f_{xR} \\ f_y - f_{yR} \\ f_z - f_{zR} \end{bmatrix} \tag{4}$$

is also computed using the measured force vector, the desired force vector and the projection operator. PID (Proportional, Integral and Derivative) controllers are applied to the six error quantities $\Delta f$, $\Delta u$, $\Delta v$, $\Delta\phi$, $\Delta\theta$ and $\Delta\Psi$ to produce six correction signals $e_1$, $e_2$, $e_3$, $e_4$, $e_5$ and $e_6$. A second nonlinear transformation is then applied to these six signals to produce correction current signals $\Delta I_1$, $\Delta I_2$, $\Delta I_3$, $\Delta I_4$, $\Delta I_5$ and $\Delta I_6$ to the joint motor armatures.

One of the main difficulties with the approach just described is the large amount of computation needed to evaluate the projection operators $P_F$ and $P_P$ as well as the two nonlinear transformations at each time step. The method also ignores additional dynamic coupling among the joints induced by the object, held by the robot gripper, and contacting a hard surface with a certain normal.

SUMMARY OF THE INVENTION

It is an object of the present invention to effect an improved force/position control for a jointed robot which is to execute a straight line motion.

A further object of the invention is to reduce the computation required for such control.

Another object of the invention is to provide some decoupling of the feedback paths when the object being positioned by the robot arm contacts a hard surface.

The above and other objects are achieved, according to the present invention, in a robotic assembly system including a robotic device composed of a base member, a plurality of movable members and joint means coupling the members in a sequence extending from the base member such that a first one of the movable members is supported by the base member and is rotatable relative to the base member about a respective axis and every other one of the movable members is supported by, and rotatable about a respective axis relative to, a respective preceding movable member in the sequence, with the last movable member in the sequence being an end member for supporting a workpiece which is to be brought to a selected position relative to a fixed body by movement along a reference plane associated with the body, the selected position corresponding to a set of reference angular positions each of which defines an angular position of a respective movable member about the respective axis thereof, computer driven displacement means coupled to the joint means for rotating each movable member about the respective axis thereof in a manner to bring the workpiece to the selected position while displacing the workpiece generally along the selected plane and pressing the workpiece against the selected plane with a force approaching a selected value, first monitoring means associated with the end member and coupled to the displacement means for producing a signal representative of the force with which the workpiece is being pressed against the reference surface, and second monitoring means coupled to the joint means and the displacement means for providing signals indicating the current angular position of each movable member about the respective axis thereof, by the improvement wherein the displacement means comprise means coupled to the joint means for effecting rotation of only one of the movable members in direct response to the signal produced by the first monitoring means.

DESCRIPTION OF THE PREFERRED EMBODIMENTS

Figure 3:
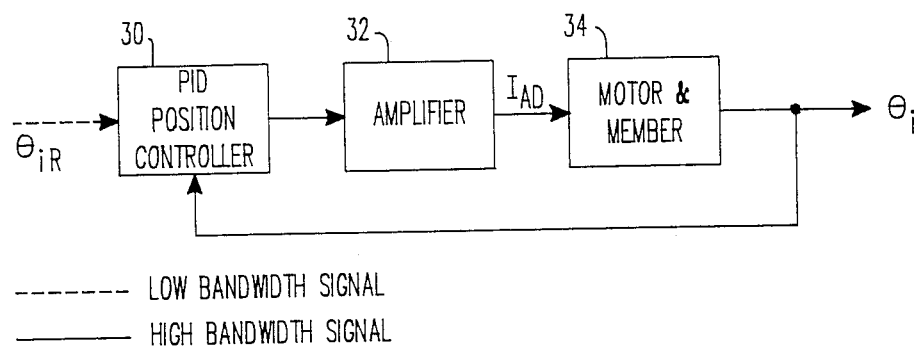
FIG. 3 is a block diagram of a unit of a position control system for controlling the robot of FIG. 1.

FIG. 3 shows a typical position control subsystem for one joint. Each joint is controlled by a PID controller 30 that servos each joint angle $\theta_i$ to its respective reference angle value $\theta_{iR}$ using feedback. PID controller 30 is usually implemented by a microprocessor computer operating at a high sampling rate of 1000 Hz or higher. Operating at a much lower rate and in an open loop fashion is a supervisory controller (not shown) that converts the desired values for the position and orientation coordinates x, y, z, $\phi$, $\theta$, and $\Psi$ (not shown) to joint reference coordinates, or angles, $\theta_{1R}$, $\theta_{2R}$, $\theta_{3R}$, $\theta_{4R}$, $\theta_{5R}$ and $\theta_{6R}$.

The supervisory controller is implemented by another microprocessor which computes the nonlinear transformation needed to cause the object carried by the robot to follow a path dictated by time varying world, or fixed, coordinates. The amount of computation involved in the nonlinear transformations usually determines the lower bandwidth of the output signals from the supervisory controller.

In order to give smooth operation, each joint controller 30 interpolates the control signals issued by the supervisory controller.

Controller 30 is followed by an amplifier 32 which supplies an armature current signal $I_{AD}$ to the associated joint motor and attached robot member 34. The position $\theta_i$ of the associated joint is then fed back to controller 30.

The invention builds on this conventional control design in a simple way: An automatically selected joint is freed from position control and instead is servoed to force control. Displacements of this selected joint from a reference angle generated first and second order position corrections for the other five joints to insure straight line motion of the gripped object.

Figure 4:
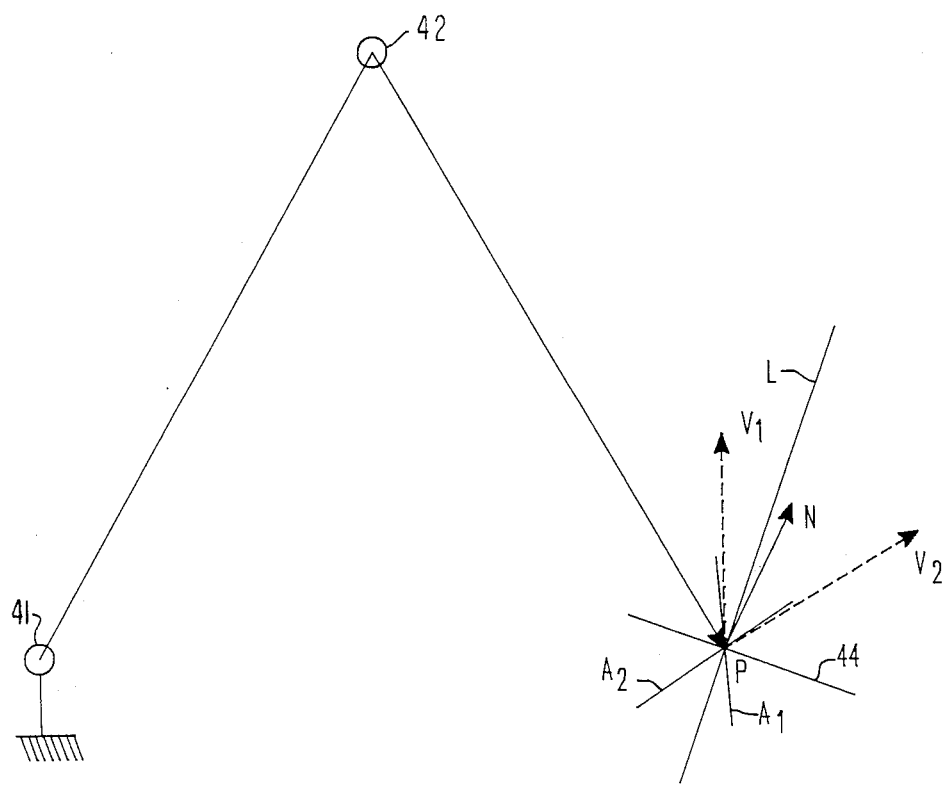
FIG. 4 is a linkage diagram illustrating control of robot movement according to the present invention.

FIG. 4 helps to illustrate how one of the joints is selected for force control. For simplicity, a two dimensional model is used for a robot possessing only two joints, 41 and 42. Point P is the contact point between an object gripped by robot end member 14 (FIG. 1) and a mating part. Surface 44 is the constraint surface which limits the motion of the gripped object for small displacements of joints 41 and 42. Surface 44 has a normal vector N. Line L is the desired straight line movement direction of the gripped part under position/force control. With joint 42 locked, motion about joint 41 generates arc A1 possessing tangent vector V1 and point P. Similarly, arc A2 with tangent vector V2 at point P is generated if joint 41 is locked and joint 42 is allowed to move. The joint whose tangent vector forms the smallest angle with the surface normal vector N is selected as the joint to be freed from position control and placed under force control. Optimum implementation of the invention is achieved when line L is aligned with N.

Figure 1:
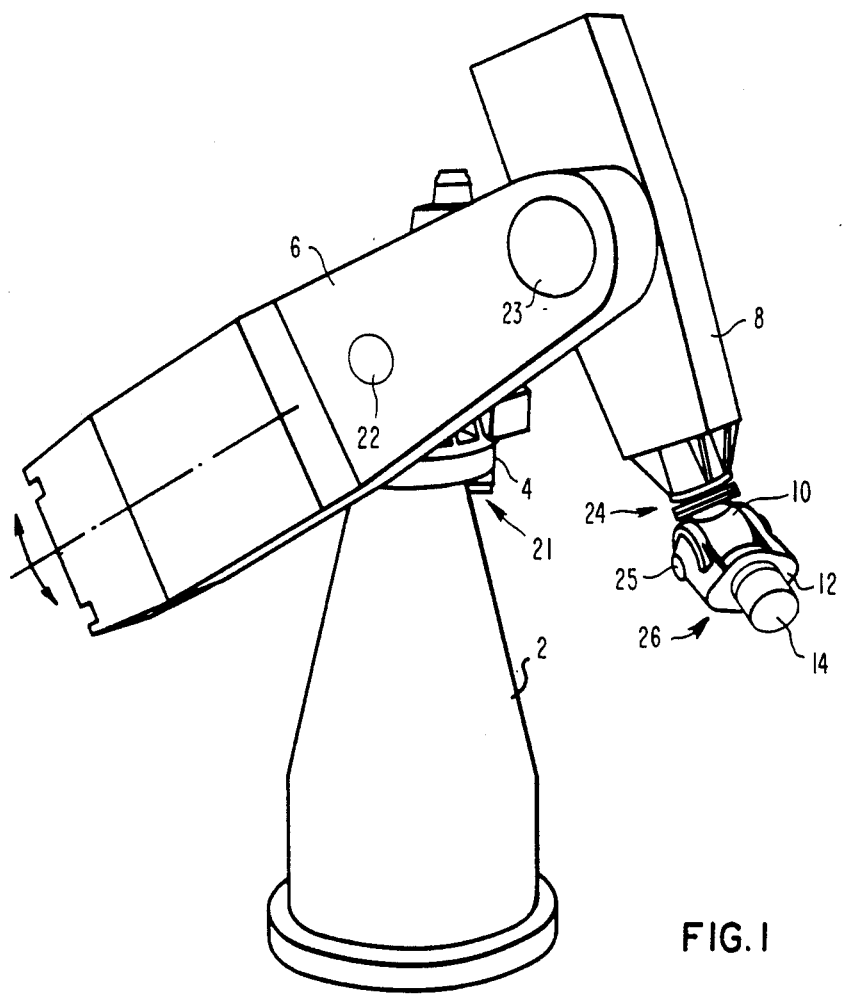
FIG. 1 is a simplified elevational view of a robot arm of the type to which the present invention is applied.
Figure 2A:
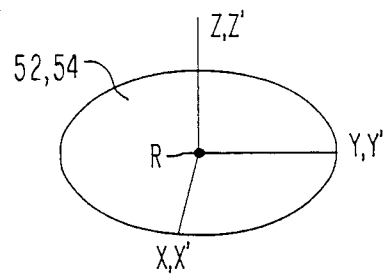
FIGS. 2A–2D are diagrams illustrating the establishment of a coordinate system defining the position and orientation of a robot end member.
Figure 2B:
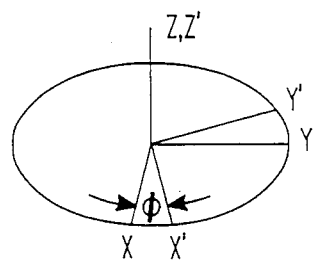
Figure 2C:
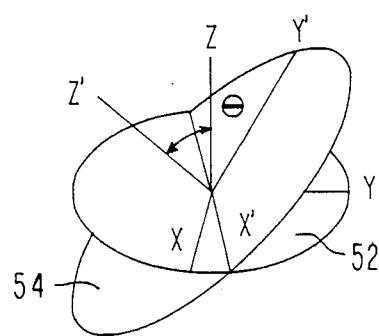
Figure 2D:
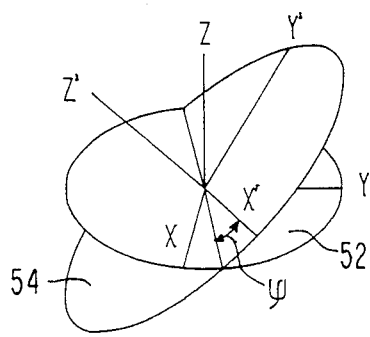

From FIG. 1 it is seen that the arcs generated by joints 21, 22 and 23 have much less curvature (due to longer radii) than those generated by wrist joints 24, 25 and 26. Thus in a practical system using a robot similar in geometry to that of FIG. 1, one would normally select the force controlled joint from among joints 21, 22 and 23. Choosing these joints permits the closest approximation to straight line motion using the control scheme described here.

Figure 5:
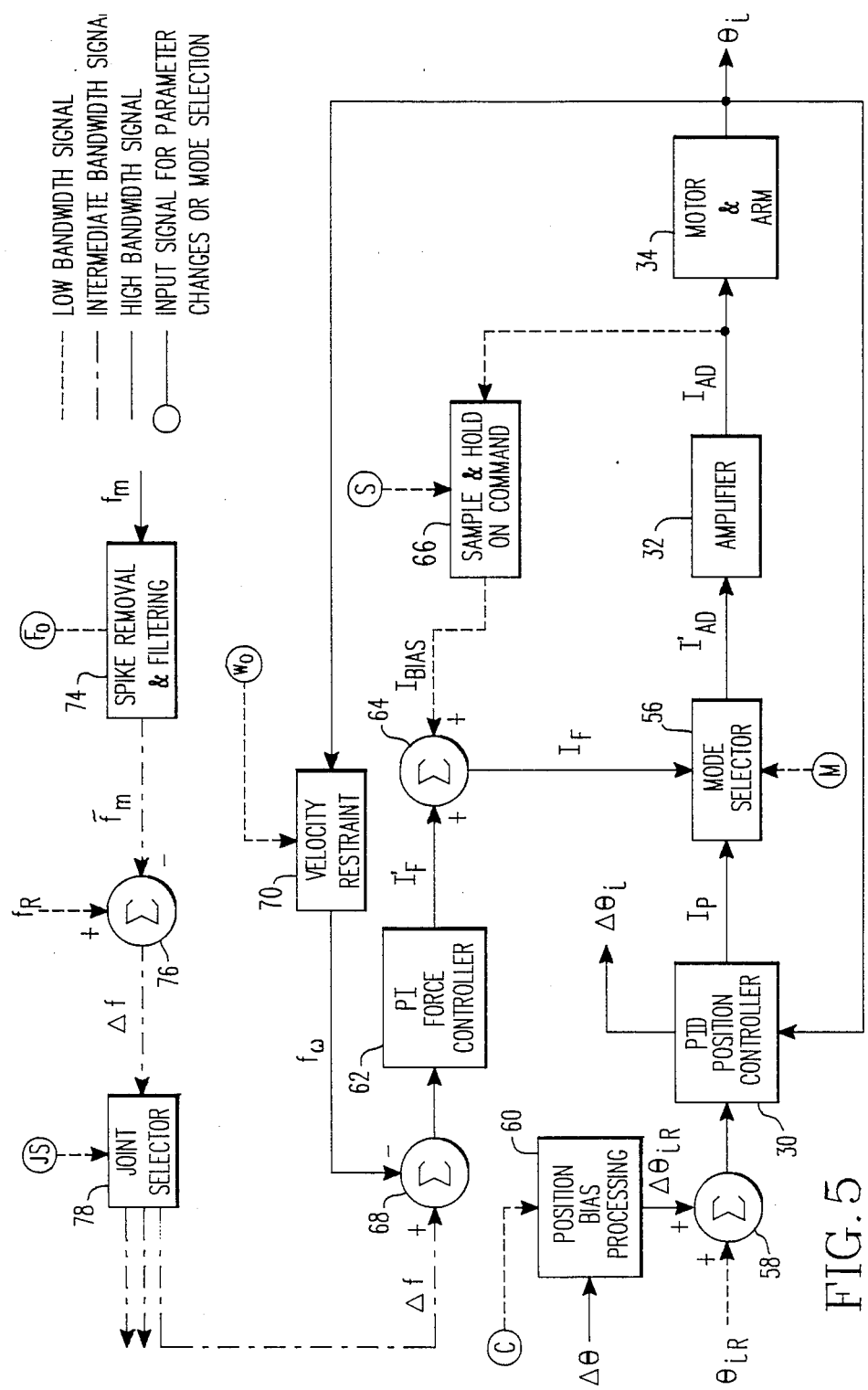
FIG. 5 is a block diagram of a robot control system according to the present invention.

FIG. 5 shows an embodiment of a PID controller subsystem for any selected one of joints 21, 22 or 23 when force control is implemented according to the invention. A motor in unit 34 is driven by the desired armature current $I_{AD}$ produced by amplifier 32 operating on a signal $I_{AD}'$. Signal $I_{AD}'$ is selected by a mode selector 56, which can be a signal-controlled switch, to be either a signal $I_P$ if the joint is under position control or a signal $I_F$ if the joint is under force control. Signal M from a master controller sets the particular mode of operation for each selected joint.

The PID position controller 30 for joint i operates in a conventional way in response to comparison of the actual angle $\theta i$ with the reference angle $\theta_{iR}$ biased by a signal $\Delta\theta_{iR}$ via an adder 58. The production of the signal $\Delta\theta_{iR}$ for each joint is one of the main elements of this invention. There is a position biasing component 60 for each joint which produces $\Delta\theta_{iR}$ as a function of a signal $\Delta\theta$ which is the difference between $\theta_{ifR}$ and $\theta_{if}$ where $i_f$ is the index, or identity, of the joint under force control. For each joint $$\Delta\theta_{iR} = A_i \cdot \Delta\theta^2 + B_i \cdot \Delta\theta \quad i \neq i_f \tag{5a}$$

while $$\Delta\theta_{iR} = 0 \text{ for } i = i_f \tag{5b}$$

since $$A_{if} = B_{if} = 0 \tag{6}$$

Position controller 30 also is constructed to produce the signal $$\Delta\theta_i = \theta_{iR} + \Delta\theta_{iR} - \theta_i \tag{7}$$

For $i=i_f$ this reduces to $\theta_{iR}-\theta_i$ since $\Delta\theta_{iR}$ is zero. The coefficients $A_i$ and $B_i$ which are set by a signal C are a function of both the joint index and the reference angles $\theta_{iR}$ of all of the joints. The signals $\Delta\theta_{iR}$ bias the angle reference positions of all of the position controlled joints so that a straight line is followed by the gripped object when the force controlled joint moves.

For wrist joints 24, 25 and 26, mode selector 56 is absent since these joints are always position controlled. When a joint is force controlled, the mode selector sets $I_{AD}'$ to $I_F$ and disconnects the PID position controller.

$$I_F = I_F' + I_{Bias} \tag{8}$$

where $I_F'$ is the output of a PI force controller 62 and $I_{Bias}$ is a constant. $I_F'$ and $I_{Bias}$ are combined in an adder 64 just before a joint is switched from position to force control, a command S from the master controller causes the current value of $I_{AD}$ of the selected joint to be sampled by a sample and hold circuit 66 so that $I_{Bias}$ is set equal to this sampled value and held at this value.

The force controller acts on a difference value $\Delta f - f_\omega$ formed by an adder 68. A velocity restraint circuit 70 operates on $\theta_i$ to produce $f_\omega$ whenever a threshold value $\omega_o$ for the joint is exceeded. This negative feedback signal $f_\omega$ limits the velocity of rotation of the joint. The limit $\omega_o$ is set by the master controller.

$$\Delta f = f_R - \widetilde{f_m} \tag{9}$$

where $f_R$ is a reference value and $\widetilde{f_m}$ is a filtered force version of a measured contact force value $f_m$. Measured contact force value $f_m$ is produced by a force sensor associated with end member 14 or its gripping mechanism. An adaptive clipping and filtering circuit 74 operates on the measured force $f_m$ to produce the signal $\widetilde{f_m}$. Circuit 74 receives a signal $F_o$ which is a force limit on the amount of clipping and is sent by the master controller. Signal $\widetilde{f_m}$ is sent as a negative signal to an adder 76 which also receives $f_R$ and produces signal $\Delta f$ that is sent to a joint selector 78. A joint selector signal JS from the master controller is coordinated with the mode selector M so that $\Delta f$ is sent to the joint under force control via joint selector 78.

Details of the different components of FIG. 5 are shown in FIG. 6. FIG. 6A shows three components that make up the spike removal and low pass filtering circuit 74. A low pass filter 80 operates on the measured contact force $f_m$ to produce a low pass signal $f_L$. An adder 82 subtractively combines $f_m$ and $f_L$ to form a high pass signal $$f_H = f_m - f_L \tag{10}$$

which is then operated on by a clipping circuit 84. A clipping limit $F_o$ is set by the master controller. An adder 86 forms a signal $$f'_m = f_c + f_L \tag{11}$$

where $f_c$ is the output of clipping circuit 84. Hence $$f'_m = f_m \text{ if } |f_H| \leq F_o \tag{12a}$$

$$f'_m = f_L + F_o \cdot \text{Sign of } f_H \text{ if } |f_H| > F_o \tag{12b}$$

As long as instantaneous changes in $f_m$ do not exceed $F_o$, $f'_m$ equals $f_m$ at all frequencies. When spikes occur, changes in $f'_m$ are limited to $F_o$. The clipping circuit is necessary since at the moment of contact between two components that are being mated a large change in force is likely to be sensed by a force torque sensor on the wrist of the robot. Finally filter 88 operates on $f'_m$ to produce low pass filtered signal $\widetilde{f_m}$. Filter 88 reduces the bandwidth of the force feedback path and helps to decouple interactions between the position feedback paths and the force feedback path.

Figure 6A:
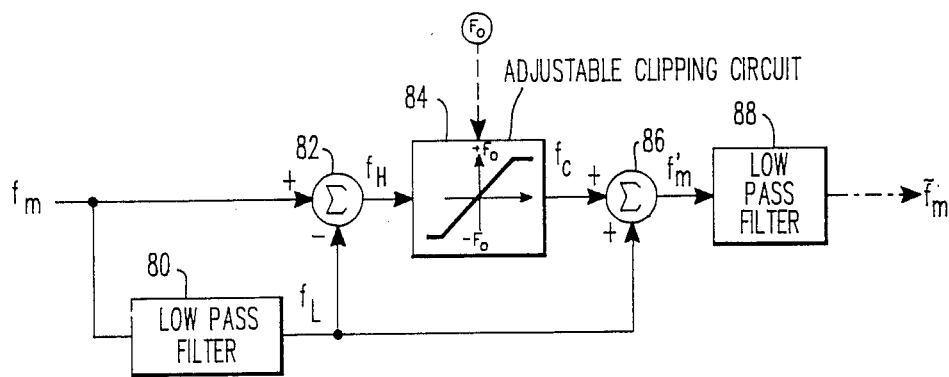
FIGS. 6A–6D are block diagrams of components of the system of FIG. 5.
Figure 6B:
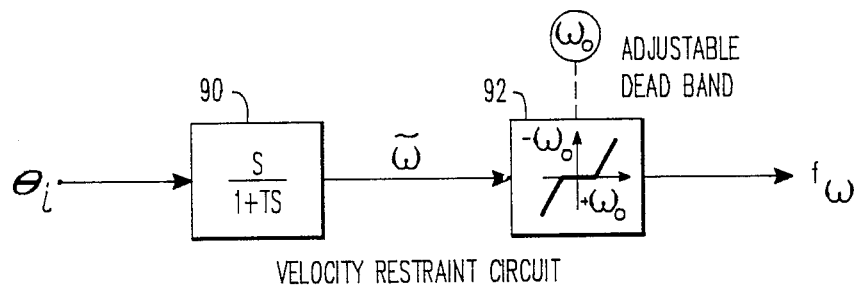

The velocity restraint circuit 70 is shown in FIG. 6B and is composed of two components. The circuit 90 described by the Laplace transform operator $s/(1+Ts)$ operates on $\theta_i$ to produce a smoothed velocity signal $\bar{\omega}$. The next component 92 has an adjustable dead band specified by $\omega_o$ from the master controller. The output signal from the high gain adjustable dead band circuit 92 $f_\omega$ and is used to apply high negative feedback to the joint when $\omega_o$ is exceeded.

Figure 6C:
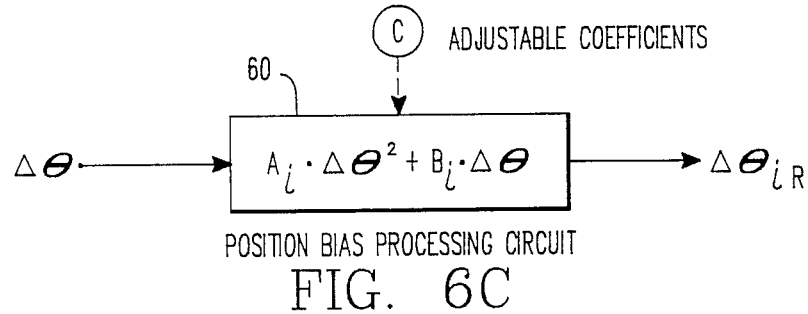

FIG. 6C shows the position bias processing circuit 60 in which equation 5a is implemented for each joint under position control. Such a circuit provides second order correction to the position setting of the five joints as a function of the single force controlled joint. Each pair $(A_i, B_i)$ is computed specifically for each joint i. The master controller sets these coefficients by the signal C.

Figure 6D:
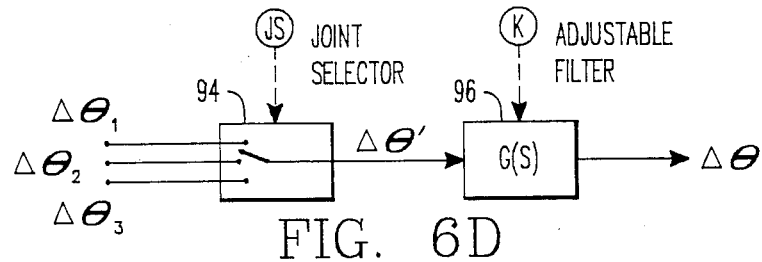

The circuit shown in FIG. 6D produces difference signal $\Delta\theta$. The joint selector signal JS from the master controller is applied to a joint selector 94 to select the force controlled joint from among $\Delta\theta_1$, $\Delta\theta_2$ or $\Delta\theta_3$ to produce $\Delta\theta'$. Then an adjustable filter 96 described by the transfer function G(s) operates on $\Delta\theta'$ to produce $\Delta\theta$. A signal K from the master controller supplies the coefficients that determine the rational transfer function G(s). Adjustable filter 96 is used to decouple a certain mode of interaction between the force controlled joint and the position controlled joints.

The master controller receives from a higher lever controller the desired part position and orientation signals x, y, z, $\phi$, $\theta$ and $\Psi$. Also desired straight line parameters $x_p$, $y_p$, $z_p$, $\phi_p$ and $\omega_p$ are received from a higher level controller. From the robot, the master controller receives the joint signals $\theta_1$, $\theta_2$, $\theta_3$, $\theta_4$, $\theta_5$ and $\theta_6$.

For both all joint position control and position/force control, the master controller sends out signals representing the reference angles $\theta_{1R}$, $\theta_{2R}$, $\theta_{3R}$, $\theta_{4R}$, $\theta_{5R}$ and $\theta_{6R}$. It updates the coefficient sets $\{A_i\}$ and $\{B_i\}$ as well as the parameters in set $\{K\}$ for G(s) at each major time step. When switching the modes of control or changing the force controlled joint, it sends out signals $F_o$, $\omega_o$, JS, set $\{M\}$ and set $\{S\}$ to the appropriate joint controller components.

The nonlinear joint transformations from world coordinates to joint coordinates are the same as used by the known position only joint control systems. The first computation done by the master controller to implement the invention is the selection of the force controlled joint in response to a command from the higher level controller to switch from position control to position/force control.

Figure 7:
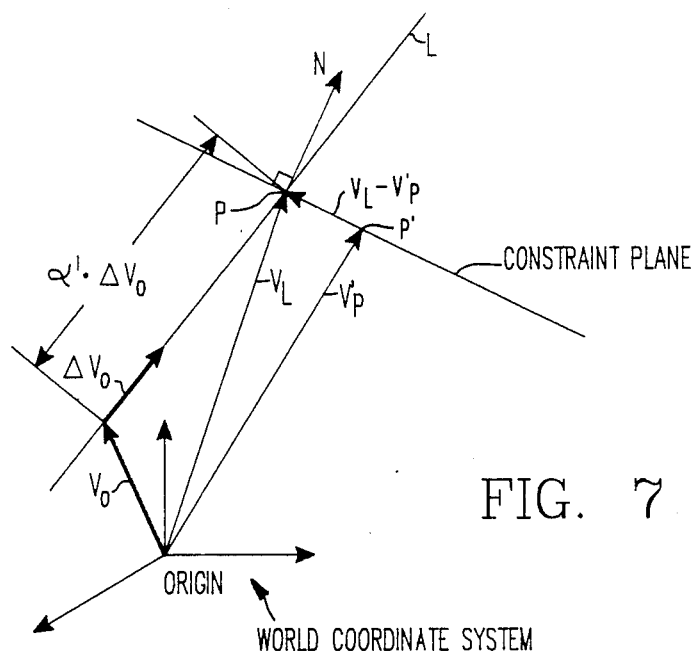
FIG. 7 is a vector diagram illustrating control techniques employed according to the present invention.

Referring to FIG. 7, a line can be specified in a number of ways. For example, a vector $$V = V_o + \alpha \cdot \Delta V_o, \text{ where } \infty < \alpha < \infty \qquad (13)$$

uses a fixed point described by a vector $V_o$ through which the line passes and a direction vector $\Delta V_o$ giving the direction of the line. Vector V is a point on the line for a specific value of the single free parameter $\alpha$. Equation 13 needs six parameters to specify the line, three for $V_o$ and three for $\Delta V_o$. The minimum number of parameters to specify a straight line is five when vector $\Delta V_o$ is a unit length vector specified by two angles such that $$\Delta x_o = (\cos \phi_p) \cdot \cos \omega_p \qquad (14)$$

$$\Delta y_o = (\sin \phi_p) \cdot \cos \omega_p \qquad (15)$$

$$\Delta z_o = (\sin \Psi_p) \qquad (16)$$

where $\Delta x_o$, $\Delta y_o$, and $\Delta z_o$ are the components of $\Delta V_o$. Hence, xp, yp, zp give $V_o$ and $\phi$p, $\Psi$p give $\Delta V_o$ according to equations 14, 15 and 16 to specify the desired straight line motion of the part. The normal vector of the constraint surface is N with components $x_N$, $y_N$ and $z_N$. For most assembly operations N would be aligned with $\Delta V_o$.

In order to select the most appropriate joint, a number of vector operations must be performed by the master controller involving the geometry of the robot. Let $R_i$ be the unit vector that is: (a) tangent, at contact point P, to the arc described by rotation of point P about the axis of joint i with all other joints locked; and (b) perpendicular to a line parallel to that axis; where i is the index of one of the joints which may be placed under force control; and $i_f$ be that index for which the vector dot product of $R_i$ with N has the maximum value, the vector dot product being:

(Magnitude of $R_i$) × (Magnitude of N) × the cosine of the angle between $R_i$ and N.

This is the index of that joint whose pivotal movement causes the path of P to be closest to N.

The signal JS is then produced to implement force control on joint $i_f$.

Next a reference point must be chosen. This is done by the master controller by first obtaining the most recent values for $\theta_1$, $\theta_2$, $\theta_3$, $\theta_4$, $\theta_5$ and $\theta_6$. Then, using a nonlinear transformation involving the geometry of the robot and these angles, the present value $x'_p$, $y'_p$, $z'_p$ of the fixed point in the gripped object is computed. As shown in FIG. 7, this present value is represented by point P' which is defined by vector $V'_p$ having components $x'_p$, $y'_p$ and $z'_p$. In general $V'_p$, will not lie on the desired straight line L described by $V_o$ and $\Delta V_o$. It is desired to translate P back to the straight line L while remaining in a plane having normal N and passing through the $V'_p$. Since the equation of such a plane is $$x_N(x_L - x'_p) + y_N(y_L - y'_p) + z_N(z_L - z'_p) = 0 \qquad (17)$$

where $x_N$, $y_N$ and $z_N$ are the components of normal vector N and $x_L$, $y_L$ and $z_L$ are the components of vector $V_L$, and since point $V_L$ must also satisfy equation 13, one finds $$\alpha' = \frac{x_N(x_o - x'_p) + y_N(y_o - y'_p) + z_N(z_o - z'_p)}{(x_N)(\Delta x_o) + (y_N)(\Delta y_o) + (z_N)(\Delta z_o)} \qquad (18)$$

and $$V_L = V_o + \alpha' \cdot \Delta V_o \qquad (19)$$

gives the desired point on the straight line. Using the components of $V_L$, namely $x_L$, $y_L$, $z_L$ and the angles $\phi$, $\theta$ and $\Psi$ of the desired pose, or orientation, as defined earlier herein, the master controller can compute updated values of $\theta_{1R}$, $\theta_{2R}$, $\theta_{3R}$, $\theta_{4R}$, $\theta_{5R}$ and $\theta_{6R}$ by the nonlinear joint transformations.

As previously indicated, when the fixed, or reference, point of the gripped object is point P, described be vector $V_L$, a unique solution results for $\theta_{1R}$, $\theta_{2R}$, $\theta_{3R}$, $\theta_{4R}$, $\theta_{5R}$ and $\theta_{6R}$.

Figure 8:
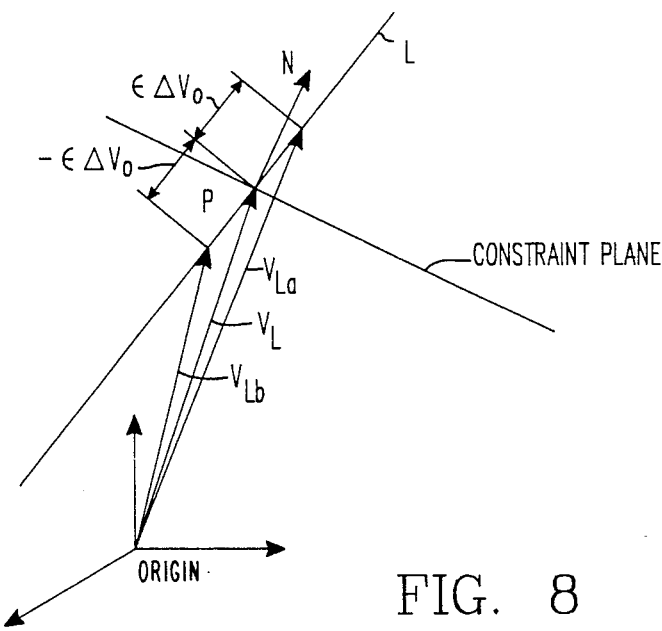
FIG. 8 is a vector diagram illustrating further aspects of the control technique according to the present invention.

FIG. 8 shows two points along line L which are located at respectively opposite sides of point P, are spaced from point P by respective vector distances $\epsilon \Delta V_o$ and $-\epsilon \Delta V_o$, and are described by respective vectors $V_{La}$ and $V_{Lb}$, where:

$$V_{La} = V_L + \epsilon \cdot \Delta V_o \qquad (20a)$$

$$V_{Lb} = V_L - \epsilon \cdot \Delta V_o \qquad (20b)$$

The nonlinear joint transformations can be applied to points $V_{La}$ and $V_{Lb}$ by the master controller to form shifted joint reference angles $\theta_{iRa}$ and $\theta_{iRb}$. It is assumed that the two points described by $V_{La}$ and $V_{Lb}$ are selected such the $0 < \epsilon < < 1$.

Then, for each of the points spaced along line L from P, there can be computed, for each joint, reference angle difference values:

$$\delta\theta_a(i) = \theta_{iRa} - \theta_{iR} \qquad (21a)$$

$$\delta\theta_b(i) = \theta_{iRb} - \theta_{iR} \qquad (21b)$$

With the joint under force control being $i_f$, the master controller computes, for each joint $i \neq i_f$:

$$A_i = \frac{1}{\delta\theta_a(if) - \delta\theta_b(if)} \left[ \frac{\delta\theta_a(i)}{\delta\theta_a(if)} - \frac{\delta\theta_b(i)}{\delta\theta_b(if)} \right] \quad (22)$$

and $$B_i = \frac{1}{\delta\theta_a(if) - \delta\theta_b(if)} \left[ \frac{\delta\theta_b(i) \cdot \delta\theta_a(if)}{\delta\theta_b(if)} - \frac{\delta\theta_a(i) \cdot \delta\theta_b(if)}{\delta\theta_a(if)} \right] \quad (23)$$

while $$A_{if} = B_{if} = 0 \quad (24)$$

These coefficients $A_i$, $B_i$ implement a second order correction in the set points $\theta_{iR}$ for $i \neq i_f$ as $\theta_{if}$ varies about its reference angle so that the point P traces a curve that differs from a straight line in proportion to $(\Delta\theta_{if})^3$.

The last computation done is the evaluation of a coefficient set $\{K\}$ for each joint i describing the associated rational transfer function G(s). This transfer function serves to decouple the force controlled joint from each position controlled joint. The coupling between the sets for two such joints can be explained as follows. When the gripped object is constrained to move on a plane having a certain normal N, motion of the position controlled joints results in movement of the force controlled joint. Motion in the force controlled joint changes $\Delta\theta_{if}$ which in turn closes a feedback loop by implementing position corrections $\Delta\theta_{iR}$, $i \neq f$, which activate all the PID position controllers. Using only linear terms, let H(s) be the transfer function relating a change in $\Delta\theta$ to a change in $\Delta\theta_{if}$ due to the five joints on position control and the planar constraint on point B.

$$\Delta\theta_{if}(s) = \theta_{ifR}(s) + H(s) \cdot \Delta\theta(s) \quad (25)$$

But $$\Delta\theta(s) = G(s) \cdot \Delta\theta_{if}(s) \quad (26)$$

so that a feedback path is clearly evident. Combining equations (25) and (26) yields:

$$\Delta\theta(s) = \frac{G(s)}{1 - G(s) \cdot H(s)} \cdot \theta_{iR}(s) \quad (27)$$

The system can be decoupled by requiring the transfer function in equation 27 to be constant at all frequencies. In steady state $G(0) = 1$ so that one obtains the constraint $$\frac{G(s)}{1 - G(s) \cdot H(s)} = \frac{1}{1 - H(0)} \quad (28)$$

or $$G(s) = \frac{1}{1 - H(0) + H(s)} \quad (29)$$

as the desired transfer function. It is easy to show that with this definition of G(s) the poles of the system with loop gain G(s)H(s) are the poles of H(s). Hence closing the feedback loop through G(s) does not change the system dynamics.

In general the transfer function H(s) will be high order; a low frequency approximation to H(s) can be made for the purpose of computing G(s).

Let $$H(s) = \frac{\sum_{i=0}^{n} a_i s^i}{1 + \sum_{i=1}^{n} b_i s^i} \quad (30)$$

be a low frequency rational approximation to H(s). Substitution of equation 30 into 29 yields:

$$G(s) = \frac{1 + \sum_{i=1}^{n} b_i s^i}{1 + \sum_{i=1}^{n} c_i s^i} \quad (31)$$

where $$c_i = a_i + (1 - a_0)b_i \quad i = 1 \text{ to } n \quad (32)$$

The master controller selects a suitable approximation to H(s) from a stored set of approximations as a function of $I_f$ and point P and then computes the $c_i$'s using equation 32. Signal set $\{K\}$ consists of sets $[b_i]$, $[c_i]$ which are sent by the master controller to adjustable filter 96 of FIG. 6d.

A practical embodiment of the invention could employ a Unimation brand Model 560 data processing system as the control system and a Puma brand robot arm as the robot device.

Summary of Variables associated with robotic system:

x, y, z, $\phi$, $\theta$, $\Psi$ define the desired position and orientation, or pose, of the reference point on the gripped object. These are computed in advance on the basis of the physical dimensions of the parts to be mated and are supplied to the master controller;

$x_p$, $y_p$, $z_p$, $\phi_p$, $\Psi_p$ define the straight line along which force control is to be applied. They are computed in advance on the basis of the physical dimensions of the parts to be mated and are supplied to the master controller;

$\theta_1$, $\theta_2$, ... $\theta_6$ are the actual robot joint angles which are indicated by angle encoders connected to each joint axis;

$\theta_{1R}$, $\theta_{2R}$, ... $\theta_{3R}$, are the desired joint angles, corresponding to the desired position and pose of the reference point on the gripped object. These angles are computed by the master controller based on the robot-specific nonlinear transformation on $V_L$;

$\{A_i\}$, $\{B_i\}$ are computed by the master controller using equations 20–24;

Fo, $w_o$ are supplied to the master controller, which outputs them to appropriate components of the control system;

$\{a_i\}$, $\{b_i\}$ computed in advance by robot manufacturer;

JS is computed by the master controller based on equations 15 and 16;

M, S are generated by the master controller as a function of JS, each time JS changes state.

Major advantages of the invention over conventional force/position control are:

Speed. The invention allows signal processing tasks to be separated according to the bandwidth requirements of the tasks. FIGS. 5 and 6 show the division of tasks into high, medium and low bandwidth. The highest bandwidth is required by the joints on position control. The invention retains standard PID position controllers with only three additional high speed tasks.

The first high speed task is the position bias processing for each joint as shown in FIG. 5. This function is very simple: it requires evaluation of the second order polynomial of equation 5a. The dedicated microprocessors that implement position control for each joint can quickly perform this calculation.

The second high speed task is the implementation of the velocity restraint and the PI force controller 62. Since the implementation of position control and the implementation of force control are mutually exclusive modes, the PID joint microprocessor 30 can easily implement the velocity restraint and the force control functions when not in the position control mode.

The third high speed task is the implementation of the adjustable filter 96 of FIG. 6D whose transfer function is G(S). It is unlikely that this filter would ever be more than the sixth order; a second order filter would probably suffice in most cases. This task could be assigned to a seventh microprocessor to obtain the necessary bandwidth.

Intermediate bandwidth tasks are associated with the processing of the measured contact force. Most assembly operations require much less precision and much less bandwidth in force control than in position control. One can take advantage of this fact by using the lower bandwidth of the force feedback loop to decouple interactions between the force feedback loop and the position feedback loop. The spike removal and filtering circuits of FIG. 6a can be assigned to the seventh microprocessor implementing G(s) or assigned to a separate microprocessor.

Finally the lowest bandwidth tasks are those of the master controller. These tasks would be implemented in a separate microprocessor. Some of these tasks, such as the nonlinear joint transformations, the updating of the sets $\{A_i\}$, $\{B_i\}$ and the computation of the reference angles, require considerable computation and are necessarily low bandwidth. Other computations such as joint selection, mode selection and the sampling of specific armature currents are only needed infrequently.

The position bias processing circuits of FIGS. 5 and 6 overcome the main difficulty of other approches where projection operators must be calculated at the highest frequency. The position bias circuits provide high bandwidth processing of $\Delta\theta$ to produce the signals $\Delta\theta_{iR}$ to implement first and second order corrections to straight line motion. These circuits enable the master controller to perform the updating of the sets $\{A_i\}$ and $\{B_i\}$ at a much lower bandwidth while still retaining the benefits of high bandwidth position servoing.

Stability. The adjustable filter 96 removes a major coupling between the force and position controllers when the gripped object is constrained to move in a plane. Be explicitly taking account of this coupling, the invention avoids potential stability problems.

It will be understood that the above description of the present invention is susceptible to various modifications, changes, and adaptations, and the same are intended to be comprehended within the meaning and range of equivalents of the appended claims.

What is claimed is:

1. In a robotic assembly system including a robotic device composed of a base member, a plurality of movable members and joint means coupling the members in a sequence extending from the base member such that a first one of the movable members is supported by the base member and is rotatable relative to the base member about a respective axis and each of the other movable members is supported by, and rotatable about a respective axis relative to, a respective preceding movable member in the sequence, with the last movable member in the sequence being an end member for supporting a workpiece which is to be brought to a selected position relative to a fixed body by movement along a surface defining a reference plane associated with the body, the selected position corresponding to a set of reference angular positions each of which defines an angular position of a respective movable member about the respective axis thereof; computer driven displacement means coupled to the joint means for rotating each movable member about the respective axis thereof in a manner to bring the workpiece to the selected position while displacing the workpiece generally along the reference plane and pressing the workpiece against the surface defining the reference plane with a force approaching a selected value; first monitoring means associated with the end member and coupled to the displacement means for producing a signal representative of the force with which the workpiece is being pressed against the reference plane; and second monitoring means coupled to the joint means and the displacement means for providing signals indicating the current angular position of each movable member about the respective axis thereof, the improvement wherein said displacement means comprise means coupled to said joint means for effecting rotation of only one of said movable members in direct response to the signal produced by said first monitoring means.

2. A system as defined in claim 1 wherein said displacement means comprise speed limiting means associated with said one of said movable members for limiting the speed of rotation of said one movable member.

3. A system as defined in claim 1 wherein said displacement means further comprise means coupled to said joint means for effecting rotation of each said movable member other than said one movable member in response to a respective signal from said second monitoring means.

4. A system as defined in claim 3 wherein said displacement means further comprise control means for decoupling the response of each of said other movable members to an associated signal produced by said second monitoring means from the response of said one movable member to the signal produced by said first monitoring means.

5. A system as defined in claim 4 wherein said control means comprise means for supplying to said joint means of each of said other movable members a movement control signal dependent on a bias signal proportional to the difference between the actual angular position and the reference angular position of said one movable member.

6. A system as defined in claim 5 wherein the movement control signal is a second order function of the bias signal.

7. A system as defined in claim 1 wherein said displacement means comprise circuit components having respectively different functions and respectively different signal bandwidth capabilities adapted to the respective functions.

8. A system as defined in claim 1 wherein said displacement means comprise selection means coupled for selecting said one movable member from among said plurality of movable members.

9. A system as defined in claim 8 wherein said selection means are coupled in said displacement means for selecting as said one movable member that movable member whose rotation causes said workpiece to trace an arc which conforms most closely to the normal to said reference plane at said selected position.

10. A system as defined in claim 9 wherein said selection means are coupled for selecting said one movable member from among those of said plurality of movable members whose axes of rotation are furthest removed from said selection position.

* * * * *